(12) United States Patent
Schafer et al.

(10) Patent No.: US 8,818,857 B1
(45) Date of Patent: Aug. 26, 2014

(54) ADVERTISING UNIQUELY IDENTIFIABLE OBJECTS ALONG WITH THIRD PARTY SEARCH RESULTS

(75) Inventors: Lance Schafer, Kelowna (CA); Jeremy Charney, Kelowna (CA); Daniel Legal, Winnipeg (CA)

(73) Assignee: Long Tail Ventures, Inc., Winnipeg (CA)

( * ) Notice: Subject to any disclaimer, the term of this patent is extended or adjusted under 35 U.S.C. 154(b) by 93 days.

(21) Appl. No.: 13/523,823

(22) Filed: Jun. 14, 2012

Related U.S. Application Data

(63) Continuation-in-part of application No. 13/523,703, filed on Jun. 14, 2012.

(51) Int. Cl.
*G06Q 30/00* (2012.01)

(52) U.S. Cl.
USPC .................. 705/14.54; 705/14.4; 705/14.49; 705/14.53

(58) Field of Classification Search
None
See application file for complete search history.

(56) References Cited

U.S. PATENT DOCUMENTS

| | | | |
|---|---|---|---|
| 7,076,443 B1 * | 7/2006 | Emens et al. | 705/14.55 |
| 8,027,977 B2 * | 9/2011 | Thambiratnam et al. | 707/736 |
| 8,239,494 B2 * | 8/2012 | Lunt | 709/219 |
| 2007/0260516 A1 * | 11/2007 | Schoen et al. | 705/14 |
| 2007/0294140 A1 * | 12/2007 | Bezos et al. | 705/27 |

* cited by examiner

*Primary Examiner* — John G Weiss
*Assistant Examiner* — Meredith A Long
(74) *Attorney, Agent, or Firm* — Brill Law Office; Jeffrey Brill

(57) ABSTRACT

An advertisement server can provide sponsored listings for uniquely identifiable objects to remote search engines. The remote search engines display the listings locally as sponsored search results. The advertisement server can verify sponsored search results remain eligible for display, in real-time with a query received by the remote search engine. The verification can be based on budget values associated with an ad campaign.

21 Claims, 6 Drawing Sheets

ADVERTISING UNIQUELY IDENTIFIABLE OBJECTS ALONG WITH THIRD PARTY SEARCH RESULTS

CROSS-REFERENCES TO RELATED APPLICATIONS

This application claims priority under 35 U.S.C. §120 as a continuation-in-part to U.S. patent application Ser. No. 13/523,703, by Schafer et al., entitled ATTRIBUTING INDIVIDUAL PPC VALUES FOR ONLINE ADVERTISING OF UNIQUELY IDENTIFIABLE OBJECTS, and filed on Jun. 14, 2012, the contents of which are hereby incorporated by reference.

FIELD OF THE INVENTION

The invention relates generally to online advertisements, and more specifically, to advertising of uniquely identifiable objects in search results.

BACKGROUND OF THE INVENTION

Online advertisements, such as sponsored search results, are important revenue generators for online service providers. For example, users of search engine services enter search queries. Sponsored search results can appear more prominently in a SERP (search engine results page) than when not sponsored. The search result can have a higher ranking, appear more conspicuously, and the like. In other words, a marketer can pay for increasing the likelihood that users will click on their search results.

A uniquely identifiable object can be distinguished from all other objects, even those with substantially similar manufacturing specifications. While a UPC (universal product code) specifies a species of product, a uniquely identifiable object is distinguishable even within the product species.

One problem with sponsored search results for uniquely identifiable objects is that marketers have never been offered a mechanism to effectively advertise sponsored uniquely identifiable objects in search results. As a result, sponsored SERPs on major search engines are limited to general items, for example, at a keyword level of specificity. Sometimes a general search engines passes search query values to a vertical search engine of an online service provider for a specified niche search. However, the general search engine forgoes the opportunity for advertising revenue for that sponsored search result.

Additionally, vertical search engines that index niche objects for an online service provider are typically limited in the ability to effectively advertise sponsored uniquely identifiable objects in search results. The online service provider can generate revenue for non-sponsored listings, but misses opportunities for monetizing sponsored search results. Moreover, the locally hosted listings may not generate revenue at all (e.g., free listings).

What is needed is a technique for third-party display of sponsored search results for uniquely identifiable objects.

SUMMARY

To meet the above-described needs, methods, computer program products, and systems for third-party display of sponsored search results for uniquely identifiable objects.

In one embodiment, an advertisement server can provide listings for uniquely identifiable objects to remote horizontal (third party) search engines. The remote search engines display the listings locally as sponsored search results. The advertisement server can programmatically verify sponsored search results remain eligible for display, in real-time with a query (e.g., search query) or other user input received by the remote third party search engine. The verification can be based on PPC (pay-per-click) values associated with an ad campaign.

In another embodiment, a vertical third party search engine can receive third-party listings for uniquely identifiable objects from a remote host. The listings are displayed responsive to search queries received from users (i.e., potential consumers). The vertical third party search engine can flag non-sponsored listings that match third-party listings as eligible for a sponsored search result. The flagging can occur during pre-processing in batch to minimize response time when search queries are received. At a later point in time, when the search query is received, eligibility of the flagged listing can be verified programmatically with the remote host.

Advantageously, search engines can monetize sponsored search results for web site and mobile specific searches. At the same time, the web sites receive additional revenue streams with third-party sponsored search results.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for third-party display of sponsored search results for uniquely identifiable objects. In general, a uniquely identifiable object can be individually distinguished over all other objects, and even those that have nearly identical manufacturing specifications, by a unique identification code (e.g., a serialized number or other type of distinguishing data). The sponsored search results can be displayed in SERPs (search engine results pages).

In one example, a user searches for used cars on a mobile device (e.g., a cell phone device, a tablet device, an Internet-enable television, and the like). The user can access an automobile marketplace web site. The marketplace is a publisher that hosts direct revenue-generating online advertisements or free advertisements submitted directly by sellers. A search engine integrated within the website returns search results to user queries for specific types of automobiles. To augment the results, the automobile marketplace web site can also list third-party sponsored advertisements or search results within the other search results. As a result, if the user clicks on one of the advertisement, the automobile marketplace web site can generate additional revenue from click-throughs to the third party sponsored search results of uniquely identifiable objects.

As used herein, the terms "third party" and "remote" are relative. From a publisher point of view, an advertisement server is a remote, third party. From an advertisement server point of view, the publisher is a remote, third party. The point of views and above terms are used interchangeably herein.

Also, please note that the disclosure herein often refers to automobiles solely for the purposes of thoroughly delineating a preferred embodiment. However, one of ordinary skill in the art will recognize, given the disclosure, that the techniques can be applied to other individually distinguishable products such as real estate or artwork. Further, services such as dentistry can be uniquely identified by time, location and/or a particular dentist within an office. Besides sponsored search results, other forms of online advertisements can be provided such as pop-ups or click-through advertisements appearing in locations other than the SERP. The sponsored search results can be limited to listings that would have appeared in a non-sponsored listing, or expanded to appear more frequently. Additional details of the techniques are provided with reference to the figures of the disclosure.

FIG. 1

Figure 1:
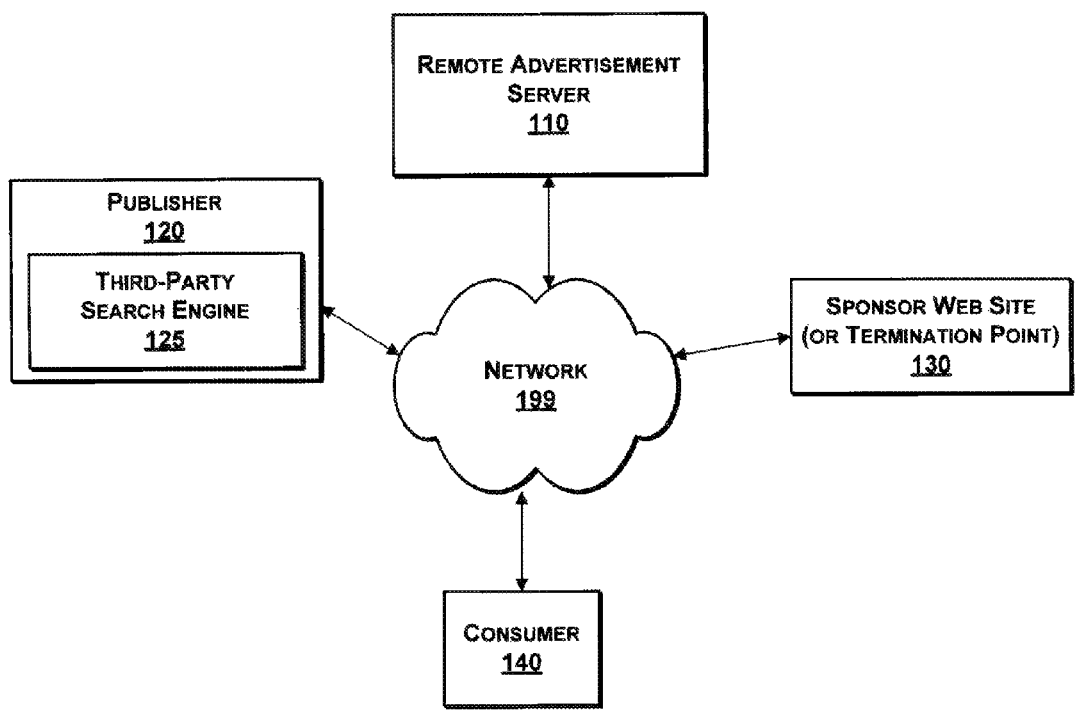
FIG. 1 is a high-level block diagram illustrating a system for third-party display of sponsored advertisements of uniquely identifiable objects, according to one embodiment.

FIG. 1 is a high-level block diagram illustrating a system 100 for third-party display of sponsored advertisements of uniquely identifiable objects, according to one embodiment. The system 100 comprises a remote advertisement server 110, a publisher 120, a sponsor web site 130, and a consumer 140. The components can be coupled to a network 199, such as the Internet, a local network or a cellular network, through any suitable wired (e.g., Ethernet) or wireless (e.g., Wi-Fi or 3G) medium, or combination. Other embodiments of communication channels are possible, including hybrid networks. Additional network components can also be part of the system 100, such as firewalls, virus scanners, routers, switches, application servers, databases, and the like.

The remote advertisement server 110 can be a computer, a set of distributed computers, a server, a virtual server, or the like. The remote advertisement server 110 can be operated by an entity that is independent from an entity operating the publisher 120. Embodiments of the remote advertisement server 110 are discussed in more detail below in association with FIG. 2.

The publisher 120 can be a computer, a set of distributed computers, a server, a virtual server, or the like. Examples of the publisher includes search engines (e.g., Google or Bing), marketplaces (e.g., LemonFree.com or Amazon.com), and the like. In the shown embodiment, the publisher includes an integrated search engine 125. However, in other embodiments, the components are not integrated, and can be owned and/or operated by a third party. The search engine 125 provides search results for user queries. In some embodiments, the search results include uniquely identifiable objects. Further, the search results can include sponsored advertisements hosted by a third party. The advertisements can be positioned at a location that is peripheral to search results, such as alongside search results with other advertisements.

The sponsor web site 130 can be an online inventory of products or services. In some embodiments, the search engine 125 sends a consumer to the sponsor web site 130. To maintain a connection with the SERP, the sponsor web site 130 can be displayed within a frame of a web page controlled by the search engine 125. Alternatively, a new tab or browser instance can be spawned. Note that the sponsored web site 130 is just one example of a termination point associated with an advertisement. Other exemplary termination points include an SMS message, a telephone number, an address that can include directions, a VDP (vehicle description page) or other deep link, an automated telephone call to the consumer 140, and the like.

The consumer 140 can be an individual, a corporate entity (e.g., car dealership), an automated process, or the like, using a computing device to use the third-party search engine 125. The computing device can be mobile (e.g., a smartphone) or stationary.

FIG. 2

Figure 2:
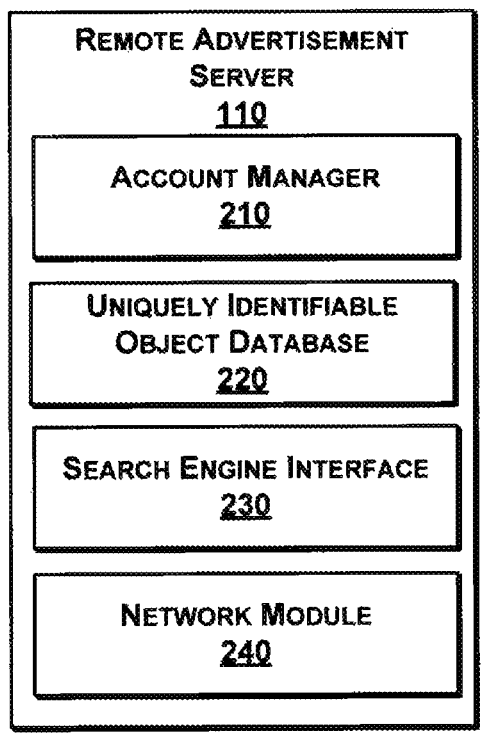
FIG. 2 is a more detailed block diagram illustrating a remote advertisement server of the system of FIG. 1, according to one embodiment.

FIG. 2 is a more detailed block diagram illustrating a remote advertisement server 110 of the system 100 of FIG. 1, according to one embodiment. The remote advertisement server 110 includes an account manager 210, a uniquely identifiable object database 220, a search engine interface 230, and a network module 240. The components can be implemented in hardware, software, or a combination of both.

The account manager 210 is an interface for a marketer to manage online advertisements. Settings can be global to the account, or particular to a uniquely identifiable object. Exemplary settings include a PPC (pay-per-click) value, a daily overall budget (e.g., a maximum spending allowance, a maximum number of clicks), a per uniquely identifiable object budget, a per uniquely identifiable object bid amount, a bid geography, a fallback termination point, and a marketing agency. In some embodiments, the account manager 210 logs click-throughs. A marketer may access the account manager 210 using a viewer such as a web browser or a local client.

The uniquely identifiable object database 220 stores data entered by a marketer about uniquely identifiable objects through the user interface, and stores data harvested from external data sources. For instance, a relational database stores a record for each uniquely identifiable object. Other data stored can include a uniquely identifiable object key (e.g., a unique identification code, such as a serial number, a VIN, or the like), a marketer identification, a bid amount, a termination point, a daily maximum, and a time stamp (i.e., record last updated), and external data (e.g., Carfax.com data). A user interface allows the marketer to manually enter PPC values.

The search engine interface 230 communicates with search engines concerning sponsored search results. In a first instance, the search engine interface 230 provides listings from the uniquely identifiable object database 220 to include in SERPs. In an embodiment, identification data for the listings are provided in batch during periodic (e.g., overnight) data transfers. The listings can be updated during specified intervals between batch transfers. For example, VINs for automobiles can be provided to a webs site like RobbiesCarLot.com or LemonFree.com for pre-processing against a local database, as described in more detail below.

In a second instance, the search engine interface 230 verifies eligibility in substantially real-time when a search query is received by a remote search engine. Further, the search engine interface 230 can suggest which sponsored advertisements to display if more than one advertisements are available. Various selection algorithms can be implemented to affect the sort order. One algorithm matches keywords of a search query from a consumer to keywords associated with an online advertisement to create relevancy. Another factor can be a bid amount and an available budget for an ad campaign to create economic ranking rationale.

The network module 240 provides lower-level interfaces with external devices such as remote search engines. The network module 240 translates commands sent and received according to a specific protocol or API (application programming interface). Moreover, network cards manage the transmission of data over a network with the external devices using IEEE standards.

FIG. 3

Figure 3:
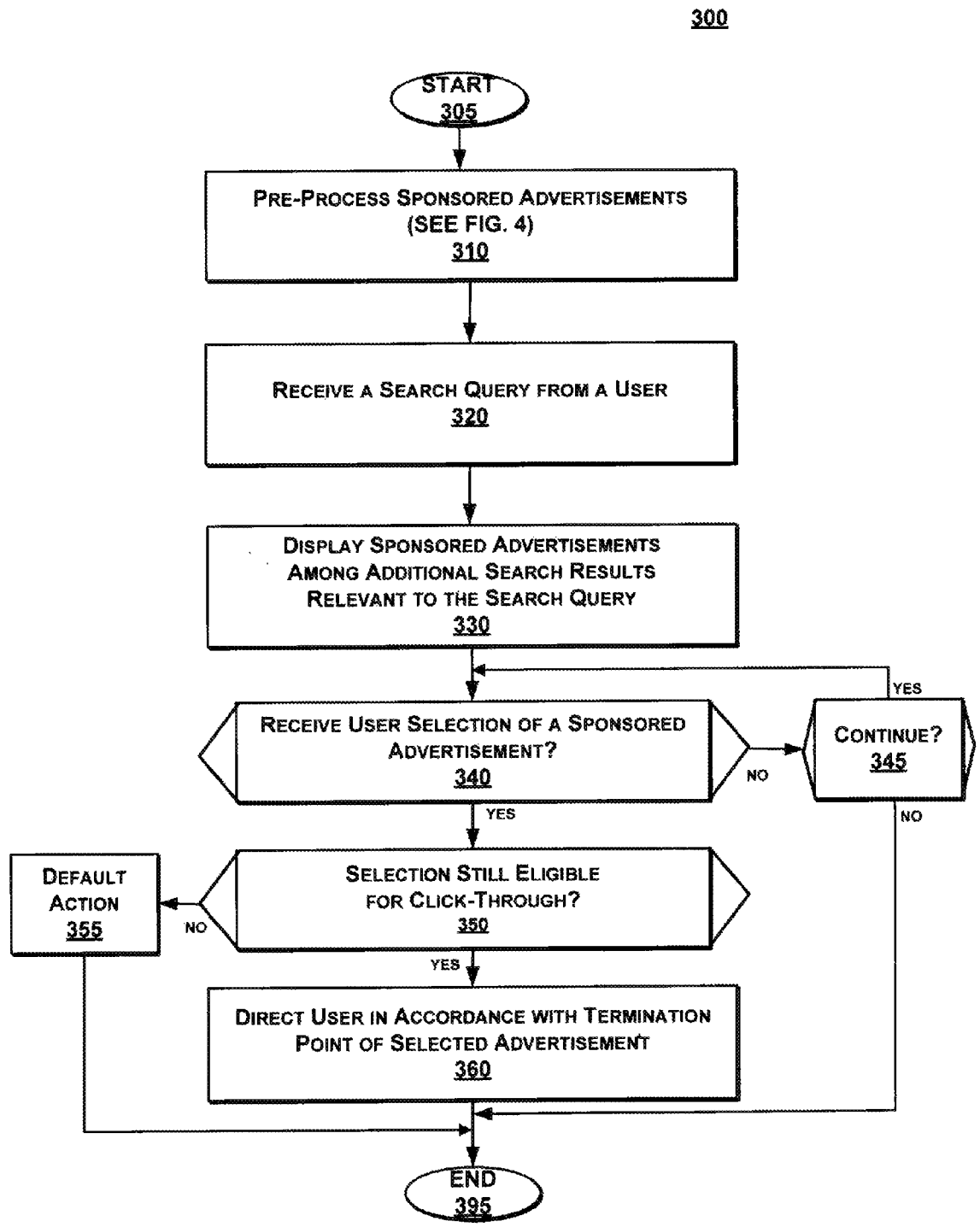
FIG. 3 is a flow diagram illustrating a method for displaying third-party sponsored advertisements of uniquely identifiable objects, according to one embodiment.

FIG. 3 is a flow diagram illustrating a method 300 for displaying third-party sponsored advertisements of uniquely identifiable objects, according to one embodiment. The method 300 can be implemented by, for example, the remote search engine 125 of FIG. 1.

At step 310, sponsored advertisements are pre-processed (e.g., flagged). By pre-processing, advertisements can be placed on-the-fly, such as when a SERP is being generated. Detailed embodiments of the pre-processing step 310 are discussed below with respect to FIG. 4.

At step 320, a search query is received from a user. For example, a consumer can enter specifications for a used car. The search query is just one form of defining a user interest. Other activity can also be used to identify interest, such as roll over activity on parts of a web page, browser history, user interests, user preferences, user cookies, and other indicators. Essentially, any activity that can provide data has a potential to be matched to sponsored search results.

The search data can be used to identify sponsored listings that are relevant. In one implementation, key words from the search query are compared to data points associated with sponsored listings. If a returned listing is flagged, it is eligible as a sponsored advertisement. Various implementation-specific algorithms can be used.

At step 330, sponsored advertisements are displayed among additional search results relevant to the query. The advertisement can be displayed within the search results, on a side along with other advertisements, as a banner (including, for example, a static image, a dynamic image, a video, and the like), in another frame, in another tab of a browser, in another instance of a browser, on a desktop, on a mobile device, and the like. In one implementation, the search results are returned quickly within the SERP. The advertisement verification process may take longer than generation of the SERP. To solve this problem, a box (e.g., a Java object) is returned at substantially the same time as the SERP, and may even be part of the SERP. However, content for the box (e.g., video, images, and text) can be received after the SERP has already been rendered.

At step 340, the method 300 holds until a user selection of a sponsored advertisement is received by continuing to loop at step 345. For example, a user click, or hover will break the loop. But the loop can also be broken at step 345 by an action that ends the process at step 395, such as the user clicking on a non-sponsored listing or closing the Internet browser.

At step 350, a selection is examined to determine whether the sponsored advertisement is still eligible for click-through. If not, a default action is taken at step 355. The sponsored search results can be verified in substantially real-time with the query. In some cases, a daily budget has been exceeded in the time between flagging and receipt of the query, or a PPC value may not exceed a threshold required by the search engine. These embodiments are discussed more fully below with respect to FIG. 5. On the other hand, some search engines merely provide flagged listings as sponsored search results without verification at this point.

Sponsored advertisements are displayed along with or within additional search results of a SERP. Non-sponsored listings that are non-sponsored are listed in order of variance, price, or other factors. However, sponsored search results can be displayed more prominently. For example, the search results are displayed at the top of the search results, using contrasting colors and text to draw attention of the consumer. Enhanced information can be provided, such as a telephone number, an index of deep links within the sponsored search result, directions to a physical location, or any type of multimedia.

The display can be implemented in many other ways. In the search engine embodiment, the online advertisement can be displayed within search results of a SERP. Also, the advertisement can be displayed in a peripheral location relative to the search results, such as to a side, as a banner, or in a different portion of a frame.

At step 360, a user is directed in accordance with a termination point associated with the sponsored advertisement, if the selected advertisement is still eligible for click-through in step 350. In a preferred embodiment, the termination point is a URL (Universal Resource Locator) reachable through a network. In other embodiments, the termination point can be an SMS message, a telephone number, an address with directions, a telephone to a customer, and the like.

FIG. 4

Figure 4:
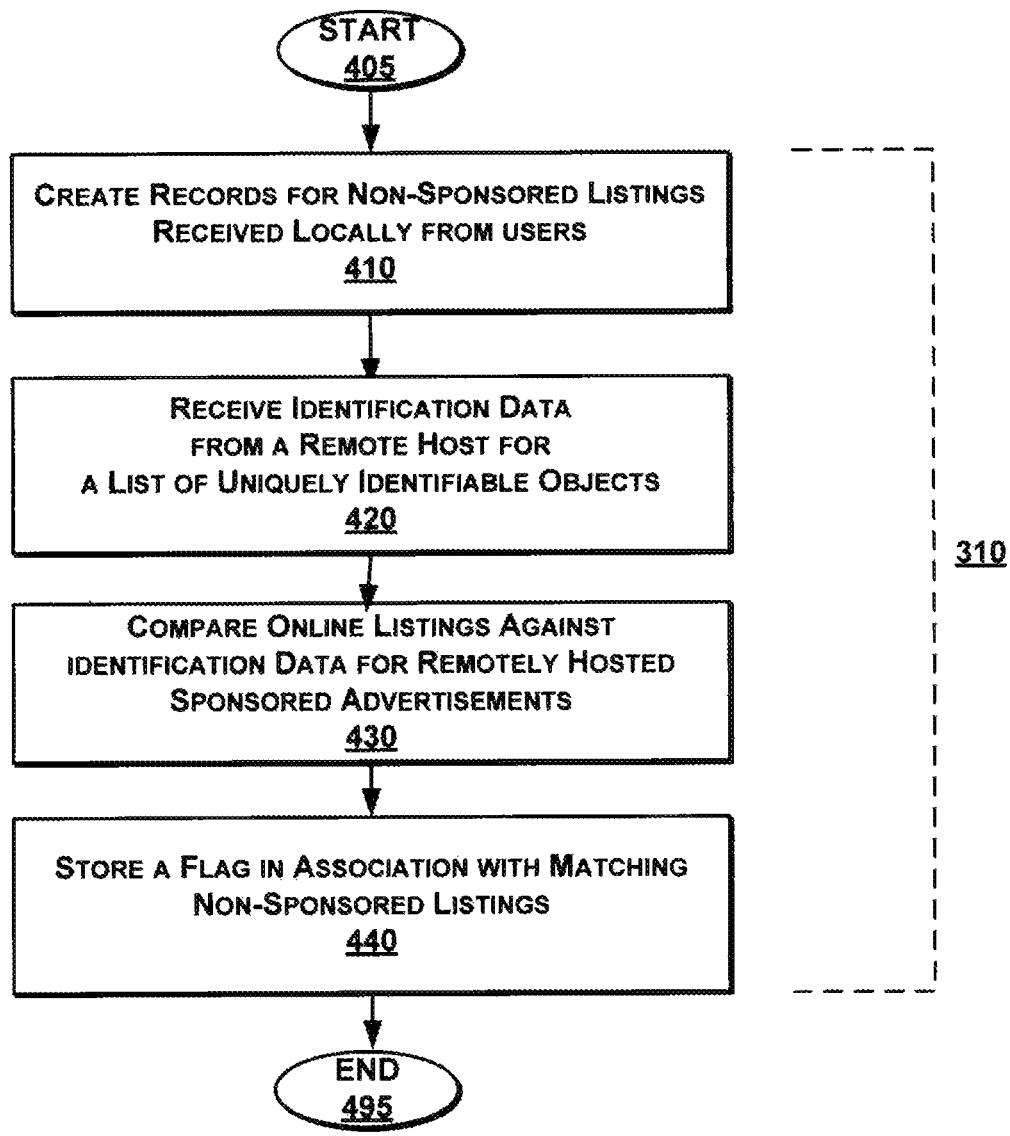
FIG. 4 is a more detailed flow diagram illustrating a method for flagging a list of non-sponsored online listings for the method of FIG. 3, according to one embodiment.

FIG. 4 is a more detailed flow diagram illustrating the step 310 for flagging a list of non-sponsored online listings for the method 300 of FIG. 3, according to one embodiment.

At step 410, records for non-sponsored online listings received locally from users are created. For example, a car dealer provides individual listings of automobiles, a uniquely identifiable object.

At step 420, identification data is received from a remote host (e.g., remote advertisement server 110) for a list of uniquely identifiable objects. The identification data can be, for example, unique identification codes, serial numbers, VINs, addresses, or any other appropriate data to uniquely identify each object. The objects can be distinguished even if manufactured to the same specifications. In one implementation, VINs are not available for cars manufactured prior to 1981, so a unique identification code can be generated.

Other data can also be sent along with the identification data. If an advertisement is an enriched listing, information can be downloaded ahead of time (e.g., multimedia files).

At step 430, identification data for non-sponsored online listings is compared against identification data for remotely hosted sponsored search results. In the car dealer example, the locally hosted listing may be a free listing, or otherwise devoid of revenue. By finding a third-party sponsorship, a publisher is able to monetize the listing. Of course, step 420 is optional in that third-party sponsored listings can be monetized by a service provider even without a matching local listing.

At step 440, a flag is stored in association with matching non-sponsored online listings. A database is updated with the flag. For instance, individual records include an entry field with a binary value of '0' for no flag and '1' for flag. Numerous variations are possible.

FIG. 5

Figure 5:
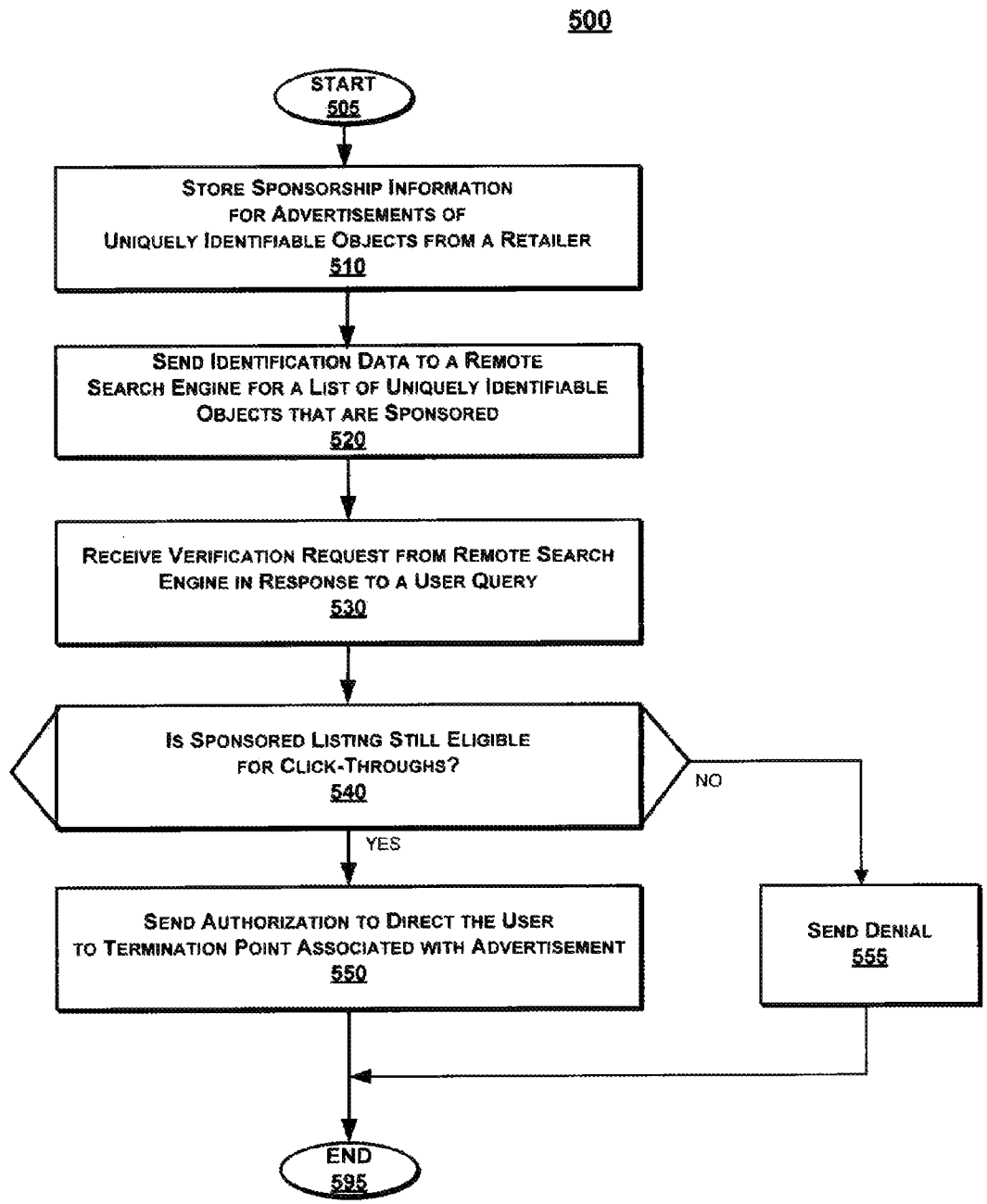
FIG. 5 is a flow diagram illustrating a method for distributing sponsored advertisements of uniquely identifiable objects for third-party display, according to one embodiment.

FIG. 5 is a flow diagram illustrating a method 500 for distributing sponsored advertisements of uniquely identifiable objects for third-party display. The method 500 can be implemented in, for example, the remote advertisement server 110 of FIG. 1.

At step 510, sponsorship information for search listings of uniquely identifiable objects from a retailer are stored. An account is created, and individual uniquely identifiable objects are populated. Identification information is automatically or manually added to the listings. Also, PPC values and associated ad campaign data is furnished.

At step 520, identification data for a list of uniquely identifiable objects that are sponsored is sent to a remote search engine for pre-processing (e.g., flagging as described herein). Relevant listings are harvested and provided for one or more search engines. The search engines can be independent, or part of the same entity.

At step 530, a verification request is received from a remote search engine in response to, for example, a user search query (or some other user input). Specifically, the remote search engine needs to know if the user should be directed to a termination point at step 550. If not verified, a denial can be sent at step 555.

At step 540, it is determined whether the sponsored search listings remain eligible for click-through. The determination can be based on influencing factors such as PPC values and other account information.

At step 550, authorization to direct a user to a termination point associated with an advertisement is sent. Variations of a termination point are discussed in detail above.

FIG. 6

Figure 6:
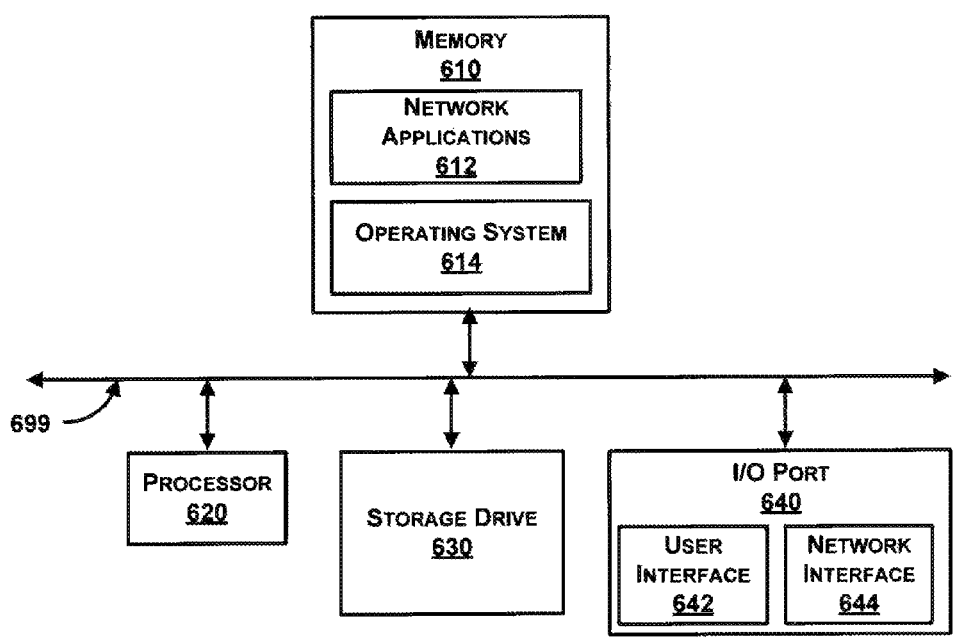
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the remote advertisement server 110, the publisher 120, the sponsor web site 130, and the consumer 140. Additionally, the system 100 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of advertisement server 110 of FIG. 2. Other network applications can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Widows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method at a publisher for displaying PPC (pay-per-click) advertisements of third-party sponsored online listings in place of local online listings for uniquely identifiable objects that are hosted by a remote advertising exchange server, the method comprising:
   prior to a query:
      storing a list of local online listings that have been submitted directly to the publisher along with local termination points associated with a web site of the publisher;

receiving identification data from a remote advertising exchange server that maintains third-party sponsored online listings submitted to the remote advertising exchange server by third-party marketers for advertising, the identification data concerning a list of uniquely identifiable objects that are sponsored for advertising in connection with search results, wherein the remote advertising exchange server is independent of a plurality of publishers that display third-party sponsored online listings, and wherein each uniquely identifiable object comprises an object that is individually identified even amongst identical objects;

flagging, by a computer, the list of local online listings that match received identification data for third-party sponsored online listings of uniquely identifiable objects;

receiving the query from a user that is searching available listings;

responsive to the query:
identifying the local online listing for a uniquely identifiable object that is relevant to the query;
substituting, by a computer, a third-party sponsored online listing for the flagged local online listings including substituting a third-party termination point for the local termination point;
displaying, by a computer, an advertisement for the third-party sponsored online listing of the uniquely identifiable object in connection with search results for local online listings relevant to the query;
receiving, by a computer, an action on the third-party online listing from the user; and
responsive to the action, querying, by a computer, the remote advertising exchange server to determine whether the third-party online listings remains eligible for PPC advertising with the publisher.

2. The method of claim 1, further comprises:
responsive to the one of the flagged local online listing being eligible for advertising, directing the user in accordance with the third-party termination point associated with the advertisement.

3. The method of claim 1, further comprising:
selecting one from a plurality of eligible advertisements to display at the publisher.

4. The method of claim 1, wherein flagging the list of local online listings occurs during a batch process prior to receiving the search query.

5. The method of claim 1, wherein querying the remote advertising exchange server to determine whether the flagged local online listing remains eligible for display occurs in substantially real-time with receiving the user action.

6. The method of claim 1, wherein the third-party online listing is displayed in at least one of the following locations: integrated within the search results, at the top of the search results, and peripheral to the search results.

7. The method of claim 1, wherein the third-party sponsored online listing has a distinct appearance relative to local online listings.

8. The method of claim 1, wherein the identification data comprises one or more unique identification codes.

9. The method of claim 1, wherein the identification data comprises one or more VINs (vehicle identification numbers) and the uniquely identifiable objects comprise vehicles.

10. The method of claim 1, wherein the third-party sponsored online listings comprise PPC advertisements that have an individual PPC value for each PPC advertisement of a uniquely identifiable object.

11. A computer-implemented method at a remote advertising exchange server for managing PPC (pay-per-click) advertisements of third-party sponsored online listings for uniquely identifiable objects that are displayed by third-party publishers, the method comprising:
storing, by a computer, identification data for sponsored online listings submitted to the remote advertising exchange server by third-party marketers for advertising, the identification data concerning a list of uniquely identifiable objects that are sponsored for advertising in connection with search results, wherein the remote advertising exchange server is independent of a plurality of publishers that display third-party sponsored online listings, and wherein each uniquely identifiable object comprises an object that is individually identified even amongst identical objects;
sending, by a computer, the identification data for at least a portion of sponsored online listings to a plurality of third-party publisher to match received identification data for third-party sponsored online listings of uniquely identifiable objects against a list of local online listings that have been submitted directly to the third-party publisher;
responsive to an action by a user on a flagged local online listing displayed as an advertisement by one of the plurality of the third-party publishers, receiving, by a computer, a query to determine whether the one of the flagged local listings remains eligible for PPC advertising with the third-party publisher.

12. A computer-readable medium storing computer code that, when executed by a processor, performs a method at a publisher for displaying PPC (pay-per-click) advertisements of third-party sponsored online listings in place of local online listings for uniquely identifiable objects that are hosted by a remote advertising exchange server, the method comprising:
prior to a query:
storing a list of local online listings that have been submitted directly to the publisher along with local termination points associated with a web site of the publisher;
receiving identification data from a remote advertising exchange server that maintains third-party sponsored online listings submitted to the remote advertising exchange server by third-party marketers for advertising, the identification data concerning a list of uniquely identifiable objects that are sponsored for advertising in connection with search results, wherein the remote advertising exchange server is independent of a plurality of publishers that display third-party sponsored online listings, and wherein each uniquely identifiable object comprises an object that is individually identified even amongst identical objects;
flagging the list of local online listings that match received identification data for third-party sponsored online listings of uniquely identifiable objects;
receiving the query from a user that is searching available listings;
responsive to the query:
identifying the local online listing for a uniquely identifiable object that is relevant to the query;
substituting a third-party sponsored online listing for the flagged local online listings including substituting a third-party termination point for the local termination point;

displaying an advertisement for the third-party sponsored online listing of the uniquely identifiable object in connection with search results for local online listings relevant to the query;

receiving an action on the third-party online listing from the user; and responsive to the action, querying the remote advertising exchange server to determine whether the third-party online listings remains eligible for PPC advertising with the publisher.

13. The computer readable medium of claim 12, wherein the method further comprises:

responsive to the one of the flagged local online listing being eligible for advertising, directing the user in accordance with the third-party termination point associated with the advertisement.

14. The computer readable medium of claim 12, wherein the method further comprises:

selecting one from a plurality of eligible advertisements to display at the publisher.

15. The computer readable medium of claim 12, wherein flagging the list of local online listings occurs during a batch process prior to receiving the search query.

16. The computer readable medium of claim 12, wherein querying the remote advertising exchange server to determine whether the flagged local online listing remains eligible for display occurs in substantially real-time with receiving the user action.

17. The computer readable medium of claim 12, wherein the third-party online listing is displayed in at least one of the following locations: integrated within the search results, at the top of the search results, and peripheral to the search results.

18. The computer readable medium of claim 12, wherein the third-party sponsored online listing has a distinct appearance relative to local online listings.

19. The computer readable medium of claim 12, wherein the identification data comprises one or more unique identification codes.

20. The computer readable medium of claim 12, wherein the identification data comprises one or more VINs (vehicle identification numbers) and the uniquely identifiable objects comprise vehicles.

21. The computer readable medium of claim 12, wherein determining eligibility further comprises:

checking one or more accounts associated with the one or more sponsored search results for at least one of: a PPC (pay-per-click) value, a daily overall budget, a per uniquely identifiable object budget, a per uniquely identifiable object bid amount, a bid geography, a device bid, a fallback termination point, and a marketing agency.

* * * * *